July 4, 1944.  S. J. WINSLOW  2,352,819
MIRROR
Filed Sept. 27, 1943  2 Sheets-Sheet 1
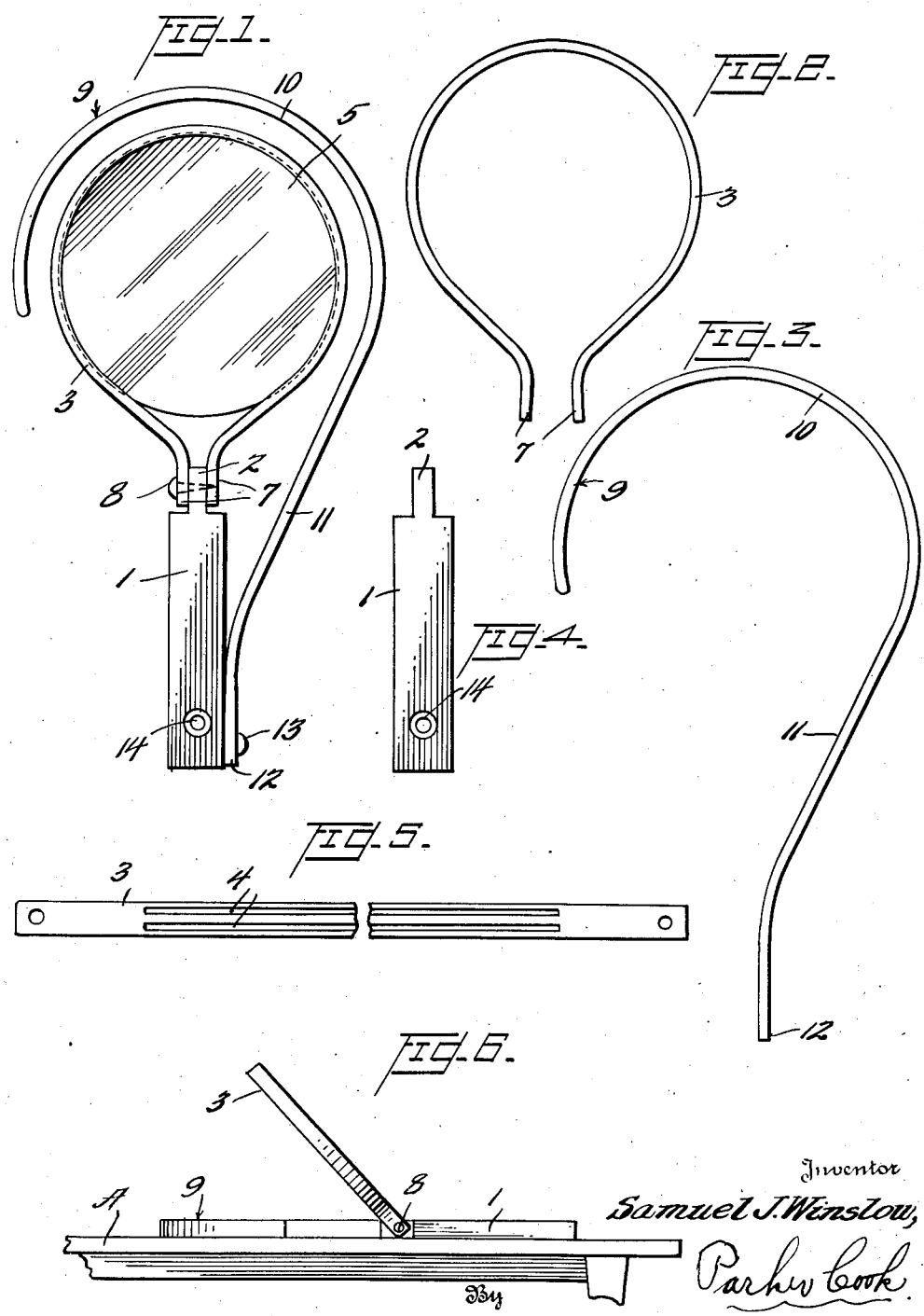

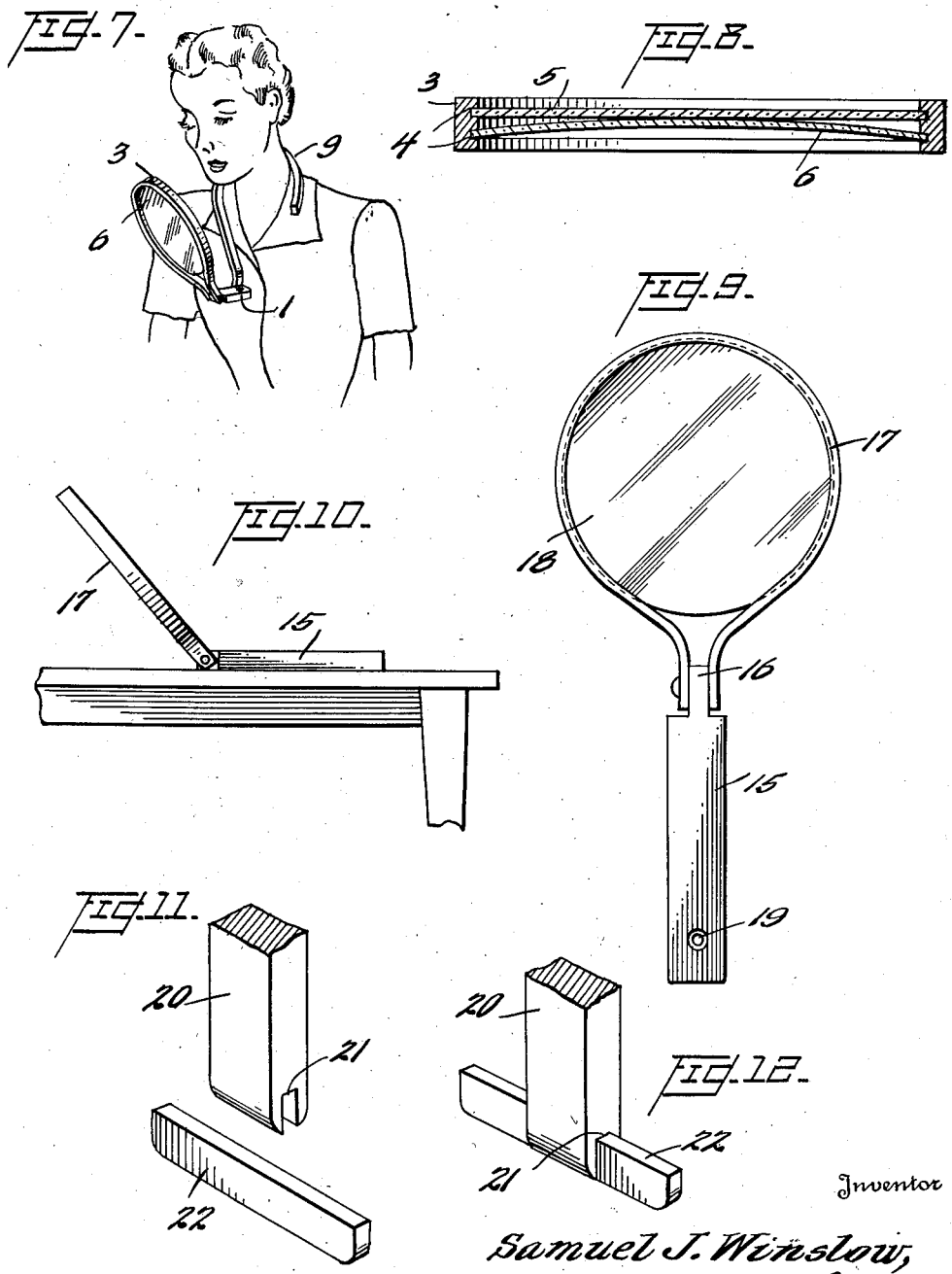

Patented July 4, 1944

2,352,819

UNITED STATES PATENT OFFICE 2,352,819

MIRROR

Samuel J. Winslow, Taunton, Mass.

Application September 27, 1943, Serial No. 503,988

2 Claims. (Cl. 88—101)

My invention relates to new and useful improvements in mirrors and more particularly to a mirror that may be used as a hand mirror or may be conveniently supported from the neck of the user so that both hands may be free to apply make-up or shave depending upon the user.

The present invention also relates to a mirror of the same general type as shown in the patent issued to me on July 13, 1943, #2,324,049. In that construction the mirrors, that is the glass, were inserted in a solid wooden ring which ring had to be accurately cut. Then it was necessary to insert a small spring-like ring to hold the glass or glasses in place.

It was also necessary to cut out a combined base and standard in which was fitted the lower end of the neck piece.

The present invention contemplates an exceedingly simple construction wherein the mirrors, that is the glasses, are fitted within grooves or slots in a narrow wooden strip and the strip then bent circumferentially about the glass and the two ends of the strip securely fastened to the tongue of a wooden standard; so that when the two ends of the strip are pulled up tightly against the tongue, the loop tightly holds the mirrors in place.

Still another object of the invention is to provide an around-the-neck mirror which is exceedingly cheap to manufacture and to assemble and is capable of a number of uses.

Still another object of the invention is to provide an around-the-neck mirror that may be quickly and readily slipped around the neck of the wearer so that it will be supported both on the chest of the wearer and around the neck thus leaving both hands of the user free.

Still another object of the invention is to provide a mirror which may be laid on the dresser or bureau and the mirror tilted so that the user can likewise use both hands in placing cosmetics on the face, etc.

Still another object of the invention is to provide a mirror wherein the neck piece may be readily omitted when the mirror is assembled at the factory and the mirror to be used as a hand mirror or supported on a table or dresser or hung on the wall at a convenient location.

Still another object of the invention is to provide a mirror wherein the frame is made entirely of wooden members, the only metal being two screws for holding the parts in their set positions.

Still another object of the invention is to provide a mirror which is so constructed that when the neck piece is omitted at the factory, the symmetry of the article is in no way destroyed.

With these and other objects in view, the invention consists in certain new and novel arrangements and combination of parts as will be hereinafter more fully disclosed and pointed out in the claims.

Referring now to the drawings showing a preferred embodiment and two modifications, Fig. 1 is a plan view of the improved around-the-neck mirror showing all the parts in their assembled position;

Fig. 2 is a detail of the bent strip in which are to be held the glasses;

Fig. 3 is a detail of the neck piece;

Fig. 4 is a detail of the standard;

Fig. 5 is a plan view of the strip shown in Fig. 2 showing the grooves therein for holding the glasses and showing the strip before being bent to shape;

Fig. 6 shows the mirror supported on a table with the glass of the mirror tilted;

Fig. 7 shows how the mirror may be conveniently supported about the neck of the wearer;

Fig. 8 is an enlarged fragmentary horizontal sectional view showing the mirrors as arranged back to back;

Fig. 9 is a plan view showing the modification, that is with the neck piece omitted;

Fig. 10 shows a mirror of this form as resting on a table with the glass being tilted;

Fig. 11 is a fragmentary detail view of a further slight modification showing the standard slotted at its end to receive a short cross piece; and Fig. 12 is a similar view with the cross piece in place.

Referring now to the several views and for the moment to Figs. 1 to 4, inclusive, there may be seen a standard 1 which is to be made out of any desired relatively hard wood, the standard being cut back at its end to provide the central tongue 2. Although I have shown this standard as being rectangular throughout its length, it will be readily understood that the outlines might be changed slightly, that is, the sides for instance might be slightly curved for the sake of appearance.

Referring now for the moment to Fig. 5, there will be seen a relatively narrow strip of wood 3, which is provided with the internal slots or grooves 4 that extend nearly throughout the length of the strip, and it is in these grooves that the respective mirrors 5 and 6 are to be fitted.

The strip is grooved and cut to length or vice versa after which it will be placed in a steam box or chest so that it may be bent in circular form to house or hold the two mirrors 5 and 6.

One of these mirrors 5 will be the ordinary form of mirror while in a back to back relationship will be the other mirror 6 which is slightly concave and known as an enlarging mirror.

This strip 3 will have its respective ends 7 curved downwardly to form what might be termed wings and these in turn are to be drawn in and secured to the tongue 2 of the standard 1 by a screw 8 or any other desirable form of fastening.

In my previous patent I showed wooden dowel pins and it will be understood that although I have not shown dowel pins in the present drawings, wooden pins may be substituted for the screws if so desired.

By having the strip of desired length and of a flexible nature and by bending the ends of the strip downwardly and inwardly, it will be seen that when the two ends are pulled together against the tongue the strip now in a substantially circular form or loop will tightly grip the two glasses in back to back relationship and will tightly hold them within their frame.

Referring now to Figs. 1 and 3, there may be seen what I term the neck piece 9.

This is also a relatively narrow thin strip of wood which has been cut to length and then steamed so that the upper portion 10 may be semi-circular in outline while the stem 11 extends downwardly and inwardly and is pivoted at its open end 12 to the proximal end of the standard 1.

The lower end of the stem it will be noticed parallels the standard for a short distance and then branches outwardly in a slow curve while the upper portion 10 extends partially around the loop that holds the mirrors.

A metal screw 13 is used to pivotally secure the neck piece to the standard and here again I might use a dowel pin if found desirable.

Also in the standard 1 may be seen the orifice 14 so that the mirror may be placed over a nail or hook on the wall if desired.

This preferred type of mirror may be used in a number of different ways. First, it may be laid on a dressing table A or the like and the mirrors 5 and 6 with their loop angularly positioned as shown in Fig. 6 so that the user sitting at a dressing table may then use the mirror for whatever purpose desired. Of course, if the enlarging mirror is to be used, the mirror and the frame will be simply turned over and the angularity of the mirror adjusted and the user will move the mirror closer to the face, as, of course, the focus has to be adjusted.

It will also be seen that the mirror may also be used simply as a hand mirror by grasping the standard or neck piece in either the left or right hand.

One of the most convenient uses, however, is that shown in Fig. 7 wherein the neck piece or semi-circular loop is placed around the neck and on the shoulders of the wearer, the standard moved to about a right-angular position with respect to the stem of the neck piece and then the mirrors and their loop tilted to the desired angle thus leaving both hands of the user free as will be readily understood.

To change from the ordinary mirror to the enlarging mirror, the mirror will be turned over and the neck piece will be placed about the neck of the wearer from the opposite shoulder.

I have found that making the standard approximately 6 inches in length and making the loop with its stem of a proportionate length, that is to extend from the base of the standard around the loop of the mirror, it is not absolutely necessary to have a cross piece or brace at the bottom of the standard as the standard will properly rest on the chest of the wearer and the loop about the neck will prevent the mirror from tilting laterally. However, a cross piece may be used as will be later mentioned.

It will also be readily understood that a mirror made in the manner above described may be manufactured at a relatively low cost and the parts quickly assembled. Also there are only two metal screws necessary and these may be dispensed with if necessary and dowel pins inserted in their stead.

Also by binding the loop about the mirrors they are rigidly held in position and cannot become loose in their frame or easily fractured in case the mirror is dropped.

Referring now to a slight modification, reference is made to Figs. 9 and 10.

It will be seen that this article is identical with the one exception that is the neck piece has been omitted. There is the standard 15 with its tongue 16 and the wooden loop 17 which holds the mirrors 18. The mirror in this form is to be used as a hand mirror or may be placed upon a support and the loop with its mirrors tilted to the desired angle. There is also the opening or orifice 19 so that the mirror may be suspended on a nail or hook on the wall. It will be noticed that the symmetry of the mirror is not greatly changed by omitting the neck piece and not only will the mirror perform its desired functions but will also be pleasing to the eye.

It might be mentioned that the mirror can be used in six different ways, that is, held in the hand so that either mirror will be toward the face of the user; tilted on the table so that either mirror may be used to face the user; or supported on the wall with either mirror toward the face of the user.

It might be mentioned that the length and weight of the standard is such with relation to the weight of the mirrors with their loop that even without the neck piece the mirror may be adjusted to an angle with relation to the standard when lying on a table without tipping over, but when the neck piece is provided, the mirror is slightly more steady, that is to say, it will not tip over if jarred where it may tip over if jarred when the neck piece is not present.

Referring to a still further modification there is shown in Fig. 12, the standard 20 having a slot 21 cut in its end so that the small cross piece 22 may be fitted within the slot if desired to possibly add additional support for the standard on the chest of the wearer. Of course, if the mirror is just to be used as a hand mirror as shown in Fig. 9, without the neck piece, it will never be necessary to have this slot and cross piece for the lower end of the standard.

From the foregoing it will be seen that I have provided an around-the-neck form of mirror that is capable of many uses, which is relatively strong in construction, and is exceedingly cheap to manufacture. Also the mirror may be provided without the neck piece, the omission of which, however, does not affect the pleasing appearance of the same.

Having thus described my invention, what I claim as new and desire to secure by Letters Patent is:

1. In a hand mirror and the like, a mirror, a wooden handle, a narrow wooden strip in the form of a loop having its free ends bent downwardly and inwardly, the said strip provided with internal grooves which extend about the major part of the loop but terminate substantially at the point of tangency between the free ends of the strip and the mirror to thus not weaken the strip at the bent portions, said mirror fitted within the loop and held in place by the confining walls of said grooves, the free ends of the loop pivotally mounted to the handle whereby the loop may be adjusted in desired angular relation to the handle and at the same time tightly hold the mirror within the grooves, a wooden neck piece having a stem, detachably and pivotally secured to the lower end of the standard, the said wooden neck piece extending upwardly in the form of a hook and partially surrounding the loop, the said neck piece adapted to be placed around the neck of the wearer and the handle adapted to rest on the chest of the wearer to position the loop and its mirror in front of the face of the user.

2. In a mirror and the like a wooden handle having a groove cut in its lower end and a detachable cross piece fitted within said groove, a narrow wooden strip in the form of a loop having its free ends bent downwardly and inwardly, the said strip provided with internal grooves which extend about the major part of the loop but terminate just short of the bent portions to thus not weaken the strip at the bent portions, a mirror fitted within the loop and held in place by the confining walls of said grooves, the free ends of the loop pivotally mounted to the handle whereby the loop may be adjusted in desired angular relation to the handle and at the same time tightly hold the mirror within the grooves, a wooden neck piece having a stem, detachably and pivotally secured to the lower end of the standard, the said wooden neck piece extending upwardly in the form of a hook and partially surrounding the loop, the said neck piece adapted to be placed around the neck of the wearer and the handle adapted to rest on the chest of the wearer to position the loop and its mirror in front of the face of the user.

SAMUEL J. WINSLOW.